United States Patent
Suzuki et al.

(10) Patent No.: US 10,310,764 B2
(45) Date of Patent: Jun. 4, 2019

(54) SEMICONDUCTOR MEMORY DEVICE AND STORAGE APPARATUS COMPRISING SEMICONDUCTOR MEMORY DEVICE

(71) Applicant: Hitachi, Ltd., Tokyo (JP)

(72) Inventors: Akifumi Suzuki, Tokyo (JP); Mitsuhiro Okada, Tokyo (JP); Satoshi Morishita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/518,289

(22) PCT Filed: Nov. 4, 2014

(86) PCT No.: PCT/JP2014/079202
§ 371 (c)(1),
(2) Date: Apr. 11, 2017

(87) PCT Pub. No.: WO2016/071954
PCT Pub. Date: May 12, 2016

(65) Prior Publication Data
US 2017/0308319 A1     Oct. 26, 2017

(51) Int. Cl.
*G06F 3/06*     (2006.01)
*G06F 12/00*     (2006.01)
(Continued)

(52) U.S. Cl.
CPC .......... *G06F 3/0635* (2013.01); *G06F 3/0611* (2013.01); *G06F 3/0656* (2013.01);
(Continued)

(58) Field of Classification Search
CPC .... G06F 3/0679; G06F 3/0656; G06F 3/0611; G06F 3/0635; G06F 3/0659; G06F 12/08; G06F 12/00; G06F 12/06; G06F 12/16
(Continued)

(56) References Cited

U.S. PATENT DOCUMENTS

| 6,041,392 A | 3/2000 | Kanamaru et al. |
| 8,966,164 B1 * | 2/2015 | Asnaashari ......... G06F 12/0246 711/103 |

(Continued)

FOREIGN PATENT DOCUMENTS

| JP | 10-275110 A | 10/1998 |
| JP | 2000-020398 A | 1/2000 |

(Continued)

OTHER PUBLICATIONS

International Search Report of PCT/JP2014/079202 dated Jan. 27, 2015.
(Continued)

*Primary Examiner* — Hua J Song
(74) *Attorney, Agent, or Firm* — Mattingly & Malur, PC

(57) ABSTRACT

The semiconductor memory device comprises a memory element group (one or more semiconductor memory elements) and a memory controller. The memory controller comprises a processor configured to process at least a part of an I/O command from a higher-level apparatus when the part of the I/O command satisfies a predetermined condition, and one or more hardware logic circuits configured to process the entire I/O command when the I/O command does not satisfy the predetermined condition.

13 Claims, 12 Drawing Sheets

(51) Int. Cl.
    *G06F 12/06*     (2006.01)
    *G06F 12/08*     (2016.01)
    *G06F 12/16*     (2006.01)

(52) U.S. Cl.
    CPC .......... *G06F 3/0659* (2013.01); *G06F 3/0679* (2013.01); *G06F 12/00* (2013.01); *G06F 12/06* (2013.01); *G06F 12/08* (2013.01); *G06F 12/16* (2013.01)

(58) Field of Classification Search
    USPC ........................................................ 711/103
    See application file for complete search history.

(56) References Cited

U.S. PATENT DOCUMENTS

| | | |
|---|---|---|
| 2012/0198130 A1 | 8/2012 | Noborikawa et al. |
| 2012/0278664 A1 | 11/2012 | Kazui |
| 2013/0238836 A1 | 9/2013 | Suzuki et al. |

FOREIGN PATENT DOCUMENTS

| | | |
|---|---|---|
| JP | 2005-071068 A | 3/2005 |
| JP | 2010-204851 A | 9/2010 |
| JP | 2012-234363 A | 11/2012 |
| JP | 2013-541743 A | 11/2013 |

OTHER PUBLICATIONS

Japanese Office Action received in corresponding Japanese Application No. 2016-557370 dated Dec. 26, 2017.

* cited by examiner

| LBA 601 | PBA 602 | PBA length 603 |
|---|---|---|
| 0x000_0000_0000 | XXX | 2 |
| 0x000_0000_0008 | YYY | 4 |
| 0x000_0000_0010 | YYY+4 | 2 |
| 0x000_0000_0018 | Unallocated | |
| 0x000_0000_0020 | ZZZ | 2 |
| .. | .. | .. |
| .. | .. | .. |
| 0x07F_FFFF_FFF8 | Unallocated | |

| PBA 791 | Chip number 792 | Block number 793 | Amount of invalid PBA 794 |
|---|---|---|---|
| 0x000_0000_0000 | 0 | 0 | 160KB |
| 0x000_0000_1000 | 0 | 1 | 1984KB |
| ~ | ~ | ~ | ~ |
| 0x001_0000_0000 | 1 | 32 | 32KB |
| 0x001_0000_1000 | 1 | 33 | 0KB |
| 0x001_0000_2000 | 1 | 34 | 160KB |
| ~ | ~ | ~ | ~ |
| 0x01F_XXXX_XXXX | 31 | 1356 | 320KB |
| ~ | ~ | ~ | ~ |

SEMICONDUCTOR MEMORY DEVICE AND STORAGE APPARATUS COMPRISING SEMICONDUCTOR MEMORY DEVICE

TECHNICAL FIELD

The present invention generally relates to I/O (Input/Output) control of data for a semiconductor memory element.

BACKGROUND ART

Refinement of a process of manufacturing semiconductor memory elements (e.g., NAND flash memories) increases applications of the semiconductor memory elements. In particular, in an enterprise field, such as of servers, the number of cases of adopting semiconductor memory devices (e.g., SSDs (Solid State Drives)) including semiconductor memory elements, instead of HDDs (Hard Disk Drives), has been increasing.

An SSD is internally equipped with multiple semiconductor memory elements, and achieves write and read (I/O processes) of a large amount of data in a short period of time through controlling the semiconductor memory elements in parallel (e.g., PTL 1).

CITATION LIST

Patent Literature

[PTL 1] US2013/0238836

SUMMARY OF INVENTION

Technical Problem

In recent years, SSDs adopting higher speed interfaces, such as PCI-Express, instead of low-speed HDD-compatible interfaces, such as SATA (Serial ATA), have been announced. For the SSDs adopting high-speed interfaces, higher I/O processing performance has been desired. This is because if the internal I/O processing performance is low, this internal I/O processing performance becomes a bottleneck even with a high-speed interface. Irrespective of whether the interface adopted by the SSD is a high speed one or not, improvement in I/O processing performance is desired.

Improvement in I/O processing performance requires, for example, controlling, in parallel, a larger number of semiconductor memory elements. Typically, the parallel control of multiple semiconductor memory elements in the SSD are performed by an embedded processor in the SSD. It is thus conceivable that the limit of the processing performance in the SSD limits the number of semiconductor memory elements that can be controlled in parallel, which in turn limits the I/O processing performance of the SSD. The limitation on the I/O processing performance of the SSD due to the limit on the processing performance of the embedded processor in the SSD is hereinafter represented as "embedded processor's processing performance bottleneck".

For example, execution of I/O processes by dedicated hardware is conceivable as a method of resolving the embedded processor's processing performance bottleneck. It is however difficult for the dedicated hardware to reserve resources dynamically and execute complicated processes. Furthermore, unlike software (computer programs), the hardware is not easy to be modified. Cases arise where change of specifications of an adopted memory (e.g., a main memory or semiconductor memory element) and change in memory configuration cannot be supported. It is more difficult for the hardware to correct bugs in case of bug discovery than for software. The difficulty causes a disadvantage of increasing development cost.

In a case where the minimum erase unit and the minimum write unit in the incorporated semiconductor memory element are different from each other (e.g., NAND flash memory), the SSD necessarily requires a process (what is called reclamation) of saving data that is included in the erase unit but inerasable. Such control requires complicated control of selecting, as erase process target area, an area where data to be saved is as small as possible. In a case where the incorporated semiconductor memory elements have limitation on the number of rewrites, a process (what is called wear leveling) that levels the number of rewrites in each area in the semiconductor memory elements incorporated in the SSD is indispensable. Such control requires a complicated process of managing the number of rewrites in each area and appropriately selecting an area to be used.

It is difficult to design hardware that performs complicated processes, such as the reclamation and wear leveling. Such control varies according to the type of semiconductor memory elements embedded in the semiconductor memory device. For example, the accuracy of required wear leveling control largely varies according to resistance to wearing of the semiconductor memory elements. Consequently, in a case where the wear leveling is embedded as hardware, the possibility may arise that the type of the adoptable semiconductor memory elements is limited.

On the other hand, in a case where the I/O processes are executed by a processor, command detection and various controls are required to be serially performed, which causes a problem in that I/O processes require time.

Solution to Problem

The semiconductor memory device comprises a memory element group (one or more semiconductor memory elements) and a memory controller. The memory controller comprises a processor configured to process at least a part of an I/O command from a higher-level apparatus when the part of the I/O command satisfies a predetermined condition, and one or more hardware logic circuits configured to process the entire I/O command when the I/O command does not satisfy the predetermined condition.

Advantageous Effects of Invention

The processing performance bottleneck of the embedded processor that performs I/O processes can be avoided. Achievement of a high performance and reduction in response time of the semiconductor memory device can be expected.

BRIEF DESCRIPTION OF DRAWINGS

FIG. 6 shows a logical-to-physical translation table.
FIG. 7 shows a block management table.

DESCRIPTION OF EMBODIMENTS

One Embodiment is hereinafter described. Note that the present invention is not limited to the Embodiment described below.

In the following description, information is sometimes described in representation of "abc table". However, the information may be represented in a data configuration other than the table. To indicate irrelevance to the data configuration, at least one element of the "abc table" can be called "abc information".

In the following description, it is assumed that semiconductor memory elements included in a semiconductor memory device are nonvolatile semiconductor memory elements, more specifically, flash memories (FM), such as NAND flash memories. Consequently, it is assumed that the semiconductor memory device is a nonvolatile semiconductor memory device, more specifically, a FM module. The FM module is an example of a FM device, such as SSD. The nonvolatile semiconductor memory element is not limited to the FM. For example, this element may be, for example, MRAM (magnetoresistive random access memory) that is a magnetoresistive memory, ReRAM (resistance random access memory) that is a resistance-change memory, FeRAM (ferroelectric random access memory) that is a ferroelectric memory or the like. Instead of the nonvolatile semiconductor memory element, a volatile semiconductor memory element may be adopted.

In the following description, it is assumed that the FM is made up of multiple "physical blocks", and each physical block is made up of multiple "physical pages". The erase unit area is larger than the access unit area. More specifically, data is accessed (read and written) in units of physical pages while the data is erased in units of physical blocks. Physical areas are allocated, in predetermined units (e.g., units of pages or units of blocks), to a logical space (logical address space) provided by the FM module. In the logical space, a range to which a physical block is allocated can be called a "logical block" while a range to which a physical page is allocated can be called a "logical page". In a case of a write-once FM, more specifically, in a case where a logical page to which a physical page is allocated is the write destination, instead of a physical page having already been allocated, an available physical page is newly allocated to the write destination logical page, and data is written in the newly allocated physical page. As to each logical page, the data written in the newly allocated physical page (latest data) is "valid data", the physical page in which the valid data is written is "valid page", the data (previous data) stored in the previously allocated physical page is "invalid data", and the physical page in which the invalid data is written is "invalid page".

(1-1) Configuration of FM Module

Figure 1:
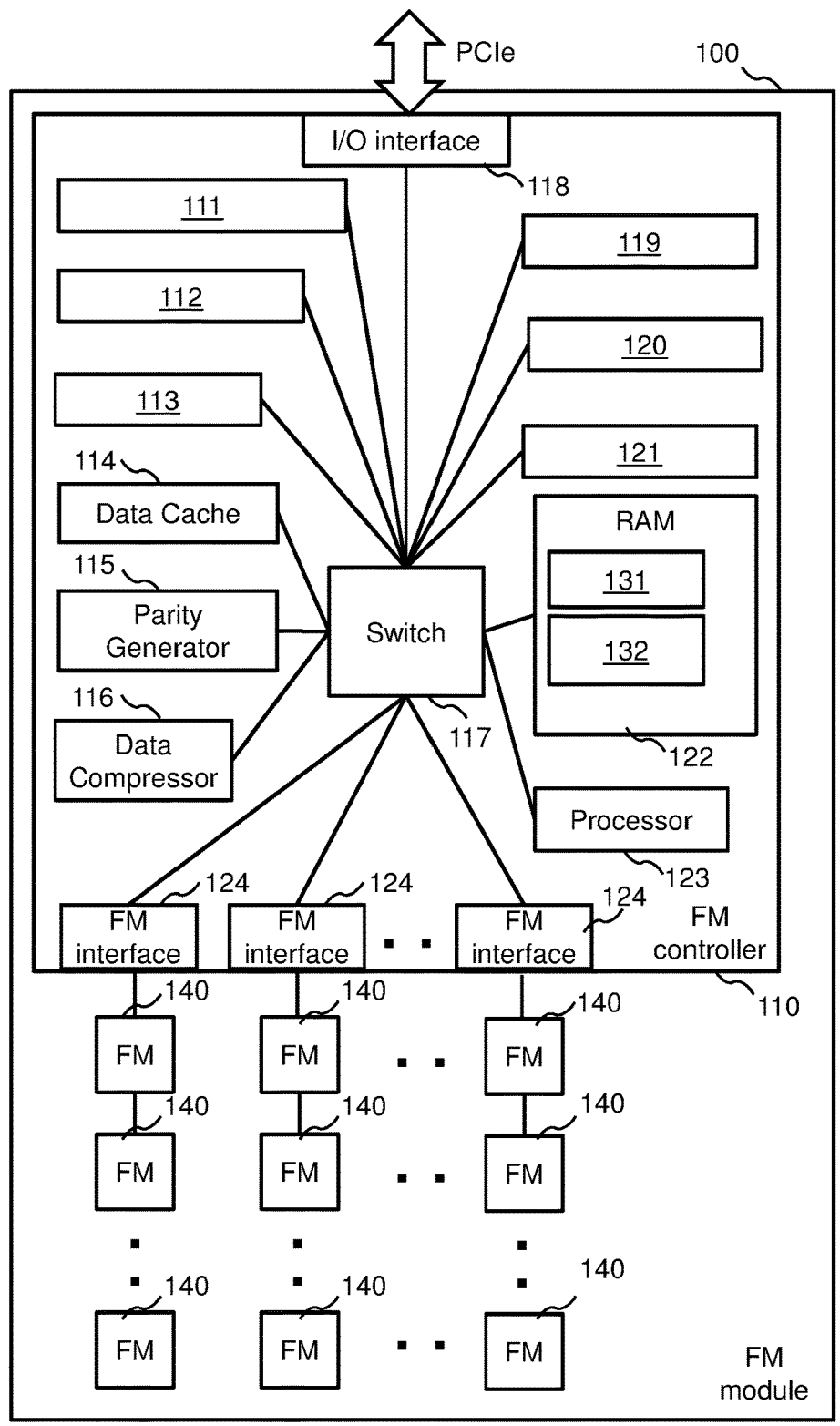
FIG. 1 is a diagram showing an internal configuration of a flash memory (FM) module according to an embodiment.

First, referring to FIG. 1, an internal configuration of an FM module 100 according to this Embodiment is described.

FIG. 1 is a diagram showing the internal configuration of the FM module 100.

Figure 12:
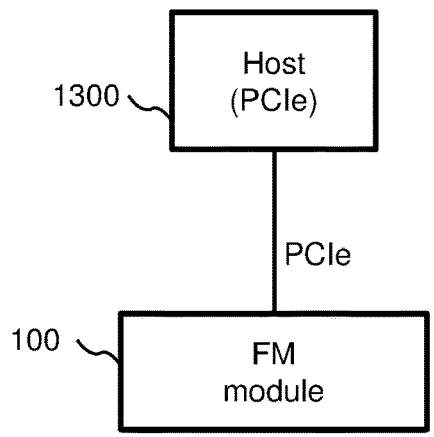
FIG. 12 shows an example of a higher-level apparatus.
Figure 13:
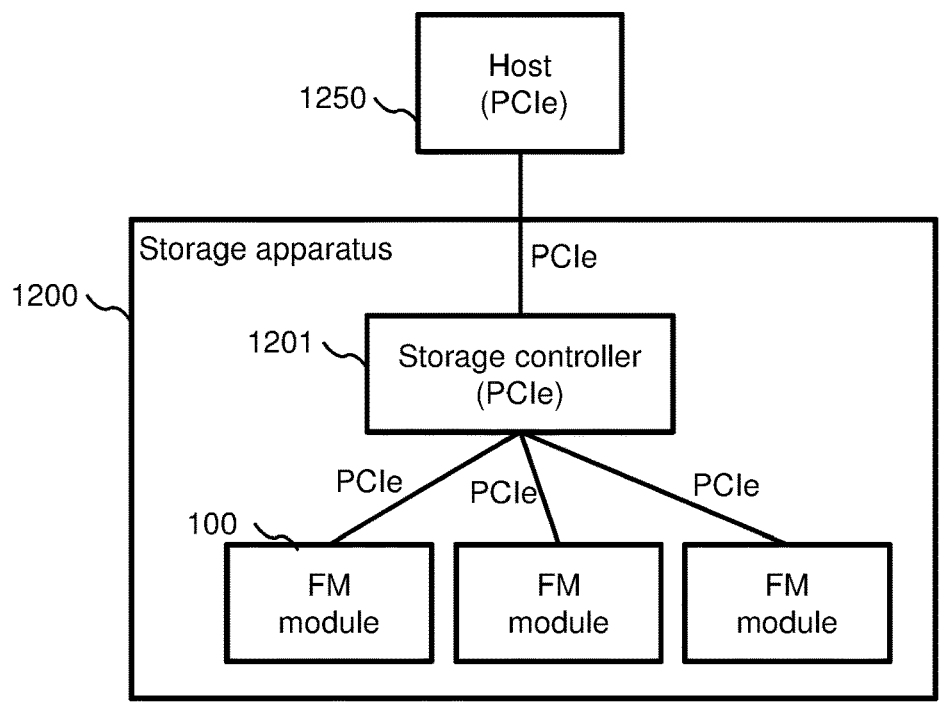
FIG. 13 shows another example of a higher-level apparatus.

The FM module 100 includes a FM group that is multiple (e.g., 32) FMs 140, and a FM controller 110 coupled to the multiple FMs 140. The FM controller 110 includes multiple devices, which are, for example, a processor 123, a RAM (Random Access Memory) 122, a data compressor (data compression/decompression unit) 116, a parity generator (parity generation unit) 115, a data cache 114, an I/O interface 118, FM interfaces 124, a command external process unit 119, a command internal process unit 120, a copy DMA (Direct Memory Access) unit 121, a cache hit determination unit 111, a cache registration unit 112, a command division unit 113, and a switch 117. Each of the cache hit determination unit 111, the cache registration unit 112, the command division unit 113, the command external process unit 119, and the command internal process unit 120 is hardware (hardware logic circuit) that executes a part of I/O process. Hereinafter, the hardware (hardware logic circuit) that executes the part of the I/O process may be specifically called "I/O hardware". The "I/O process" in this Embodiment is a process of an I/O command from the higher-level apparatus. More specifically, the process is a write command process (processes that include a process shown in FIG. 2 and a process shown in FIG. 3), and a read command process (processes include a process shown in FIG. 4 and a process shown in FIG. 5). The "higher-level apparatus" is an apparatus that transmits an I/O command to the FM module 100. For example, a host computer 1300 is the higher-level apparatus, with reference to FIG. 12. For example, a storage controller 1201 is the higher-level apparatus, with reference to FIG. 13. More specifically, in the storage apparatus 1200, the multiple FM modules 100 are each coupled to the storage controller 1201. The storage controller 1201 receives an I/O request from a host computer 1250, and transmits an I/O command to the FM module 100 on the basis of the I/O request. In FIG. 12, the host computer 1300 and the FM module 100 may communicate with each other via a high-speed interface, such as PCIe (PCI Express). In FIG. 13, the storage controller 1201 and the FM modules 100 may communicate with each other via a high-speed interface, such as PCIe.

Reference is made again to FIG. 1. The switch 117 is coupled with the processor 123, the RAM 122, the data compressor 116, the parity generator 115, the data cache 114, the I/O interface 118, the FM interfaces 124, the cache hit determination unit 111, the cache registration unit 112, the command division unit 113, the command external process unit 119, the command internal process unit 120, and the copy DMA unit 121. The switch 117 routes and transfers data between devices (elements) according to an address (or ID). In this Embodiment, as show in FIG. 1, an example where the devices are each coupled to the single switch 117 with a star topology is described. However, the present invention is not limited to this example. It is only required that the devices are communicatively coupled.

The I/O interface 118 is a device for coupling to the higher-level apparatus. The I/O interface 118 can communicate with the other devices in the FM controller 110 through the switch 117. The I/O interface 118 receives I/O commands (write command/read command) from the higher-level apparatus. In the I/O command, a logical address (typically, LBA (Logical Block Address)) that indicates an I/O destination (write destination or read source) is designated. When the I/O command is the write command, the I/O interface 118 receives write target data associated with the write command (hereinafter, sometimes called "write data"). The I/O interface 118 records the received write data in the RAM 122. Upon receipt of a command from the higher-level apparatus, the I/O interface 118 performs an interrupt to the processor 123, or writes data for notification about receipt of the command in a memory area on the RAM 122 which the processor 123 is poling.

The processor 123 communicates with the other devices in the FM controller 110 through the switch 117. The processor 123 controls the entire FM controller 110 on the basis of a program and a management table stored in the RAM 122. The processor 123 monitors the entire FM controller 110 through functions of periodically acquiring information (e.g., polling the RAM 122) and of receiving the interrupt.

The data cache 114 is an example of a temporary memory area, and temporarily stores data which is to be transferred by the FM controller 110. In this Embodiment, the data cache 114 is a buffer where read data does not remain. Alternatively, this cache may be a memory area, such as a cache memory, where read data remains.

The multiple FM interfaces 124 are provided in the FM controller 110, and can perform I/O for the multiple FMs 140 in parallel through the multiple FM interfaces 124. One bus is coupled to one FM interface 124. Two FMs 140 are coupled to one bus. In this Embodiment, 16 FM interfaces 124 reside. Consequently, 16 buses reside and, as a result, 32 FMs reside. The FM interface 124 outputs a CE (Chip Enable) signal to the FMs 140, which is the I/O destination, thereby allowing two FMs coupled to the same bus to be independently controlled.

The FM interface 124 operates according to I/O instructions (write instruction/read instruction) issued by the processor 123 (or I/O hardware (e.g., the command internal process unit 120)). In the I/O instruction, for example, a chip number (the identification number of FM 140), a block number (the identification number of a physical block in FM 140), and (the identification number of a physical page in the physical block in the FM 140) are designated as information that indicates the I/O destination. When the I/O instruction is the read instruction, the FM interface 124 transfers (writes), to the data cache 114, data read from the read source area (the physical page in the FMs 140) according to the read instruction. When the I/O instruction is the write instruction, the FM interface 124 reads the write target data from the data cache 114, and transfers (writes) the data to the write destination area (the physical page in the FMs 140) according to the write destination. In a case where the FM interface 124 can transfer data to the higher-level apparatus without intervention of the data cache 114, the data read according to the read instruction may be transferred to the higher-level apparatus without being stored in the data cache 114.

The FM interface 124 may include an ECC (Error Correction Code/Error Checking and Correction) generation circuit, a data loss detection circuit according to ECC, and an ECC correction circuit. In the case of data writing, the FM interface 124 may add ECC to the data and write the data in the FM 140. In the case of data reading, the FM interface 124 may cause the data loss detection circuit according to ECC to inspect the data read from the FM 140. When data loss is detected, this interface may cause the ECC correction circuit to correct the data.

The data compressor 116 has a function of processing a lossless compression algorithm, various types of algorithms, and a function of changing the compression level. The data compressor (data compression/decompression unit) 116 reads data from the data cache 114 according to an instruction from the processor 123 (or I/O hardware (e.g., the command internal process unit 120)), performs a data compression operation or a data decompression (unarchiving) operation, which is an inverse transformation of data compression, according to a lossless compression algorithm, and rewrites the result in the data cache. The data compressor 116 may be implemented as hardware (logic circuit). Alternatively, an analogous function may be implemented by causing the processor 123 to process a compression/decompression program.

The parity generator 115 has parity generation functions, such as an XOR operation, an Even Odd operation, and a Reed-Solomon operation. The parity generator 115 reads data whose parity is to be generated, according to an instruction from the processor 123 (or I/O hardware (e.g., command internal process unit 120)), and causes the parity generation function to generate RAID5 or RAID6 parity.

The cache hit determination unit 111 is hardware that determines whether the data in an I/O destination logical address range (e.g., LBA range) designated by an I/O command from the higher-level apparatus is recorded in a cache area in the data cache 114, with reference to a cache hit determination table.

The cache registration unit 112 operates when the write command is issued from the higher-level apparatus, and updates the cache hit determination table in order to manage storage of the write data in the cache in the data cache 114.

The command division unit 113 is hardware that divides an I/O command from the higher-level apparatus into multiple sub-I/O commands. The command division unit 113 divides the I/O command in units of LBA management in the FM module 100. In this Embodiment, the example of dividing the I/O command received from the higher-level apparatus is described. However, the command to be divided is not limited to the I/O command from the higher-level apparatus.

The command external process unit 119 is hardware that controls the command exchanged with the higher-level apparatus. The higher-level apparatus accesses the register of the command external process unit 119, thus issuing notification about creation of the command to the FM module 100. The notified command external process unit 119 acquires the command from the higher-level apparatus.

Upon completion of the command from the higher-level apparatus, the command external process unit 119 notifies the higher-level apparatus of the completion of the command. The higher-level apparatus accesses the register of the command external process unit 119 (e.g., writes, in the resister, information that means receipt of the completion notification), thus issuing notification about receipt of the completion notification from the FM module 100.

The command internal process unit 120 is hardware that processes the command in the FM module 100. In Embodiment, when the cache hit determination unit 111 determines that a request target area of a sub-read command that is a division of the read command in units of internal LBA management is not recorded in the cache, the command internal process unit 120 converts the sub-read command into a command for the FM interface 124, and notifies the FM interface 124 of creation of the command.

The copy DMA unit 121 is hardware that mainly operates when copying the data in the data cache 114. The copy DMA unit 121 copies the data recorded in the memory area in the data cache 114 to another area according to the instruction from the processor 123.

Each of the switch 117, the I/O interface 118, the processor 123, the data cache 114, the FM interface 124, the data compressor 116, the parity generator 115, the cache hit determination unit 111, the cache registration unit 112, the command division unit 113, the command external process unit 119, the command internal process unit 120, and the copy DMA unit 121, which have been described above, may be configured as an ASIC (Application Specific Integrated Circuit) or an FPBA (Field Programmable Gate Array) in a single semiconductor element. Alternatively, a configuration may be adopted where multiple individual and dedicated ICs (Integrated Circuits) are coupled to each other.

Typically, the RAM 122 may be volatile memory, such as DRAM (Dynamic Random Access Memory). The RAM 122 stores the management table of the FMs 140 used in the FM module 100, the sub-commands created by the command division unit, a transfer list that contains transfer control information used by DMA and the like. A configuration may be adopted where the RAM 122 contains some or all of the functions of the data cache 114 that stores data and these functions are used to store the data.

The configuration of an FM module 100 according to this Embodiment has thus been described above with reference to FIG. 1. In this Embodiment, as shown in FIG. 1, the FM module 100 equipped with the FMs 140 is described. The incorporated nonvolatile memory is not limited to FM. Alternatively, the memory may be Phase Change RAM, Resistance RAM or the like.

(1-2) First Management Table: Logical-to-Physical Translation Table

Subsequently, a management table used for control by the FM module 100 is described.

The FM module 100 is equipped with the multiple FMs 140 (chips), manages the memory area that includes multiple blocks (physical blocks) and multiple pages (physical pages), and provides the higher-level apparatus with the logical space (logical area) as the memory area. The physical area made up of the FMs 140 is uniquely associated with the address space used only in the FM module 100 and managed. Hereinafter, the address space for designating the physical area used only in the FM module 100 is represented as PBAs (Physical Block Addresses). The FM controller 110 associates the multiple PBAs with respective LBAs (Logical Block Addresses) corresponding to the logical space (address space) provided for the higher-level apparatus, and manages the associated addresses.

A logical-to-physical translation table 600, which is a management table for managing association in the FM module 100, is described with reference to FIG. 6.

FIG. 6 shows the logical-to-physical translation table 600.

The logical-to-physical translation table 600 is stored in a memory area in the FM module 100, e.g., the RAM 122. The logical-to-physical translation table 600 contains the LBA 601, PBA 602 and PBA length 603 for each combination (association) of LBA/PBA. The LBA 601 indicates the LBA, and the PBA 602 indicates the PBA. The PBA length 603 indicates the length of PBA. The PBA length varies according to whether the data is compressed by the data compressor 116 or not. When the I/O command is the read command, the processor 123 or the I/O hardware (e.g., the command internal process unit 120) identifies the PBA and the PBA length corresponding to the LBA designated by the read command from the higher-level apparatus with reference to the logical-to-physical translation table 600, and reads data from the physical area (the area in the FM group) corresponding to the identified PBA and PBA length. When the I/O command is the write command, the processor 123 or the I/O hardware (e.g., the command internal process unit 120) identifies the PBA corresponding to the LBA designated by the write command from the higher-level apparatus (i.e., the PBA indicating the physical area where pre-updated data) with reference to the logical-to-physical translation table 600, and determines a PBA (a PBA corresponding to one or more available pages that are to be the write destination) different from the identified PBA and the PBA length. The processor 123 or the I/O hardware (e.g., the command internal process unit 120) records the determined PBA and PBA length in a corresponding spot in the logical-to-physical translation table 600 (the field corresponding to the LBA designated by the write command from the higher-level apparatus). This operation allows the data in the logical area to be overwritten.

In the column of the LBA 601, LBAs belonging to the logical space provided by the FM module 100 are sequentially arranged in units of predetermined sizes (every 4 KB in this Embodiment). More specifically, the logical space is divided into predetermined sizes. An entry (record) resides for each unit logical area in the table 600. For example, a numeric value of one in the LBA 601 means one sector of 512 bytes. This means that the association between the LBA and PBA is managed in units of 4 KB in this Embodiment. Consequently, the units for dividing the logical space can be called a management unit. However, the present invention does not limit the semiconductor memory device, such as the FM module 100, to the case where the combination (association) between the logical address, such as LBA, and the physical address, such as PBA, is managed in units of 4 KB. The LBA may be managed in any unit.

The PBA 602 indicates the leading PBA associated with the LBA. In this Embodiment, the PBA is managed in units of 512 bytes. In the example of FIG. 6, a certain PBA value "XXX" is associated as the PBA associated with the LBA "0x000_0000_0000". This PBA value is an address that uniquely indicates the memory area of FM. The PBA "XXX" is thus identified when the LBA "0x000_0000_0000" is designated in the read command. The PBA "unallocated" is associated, when there is no PBA associated with the LBA (i.e., the available range in the logical space).

The PBA length 603 represents the actual size of data in the number of sectors (one sector=512 bytes). The example illustrated in FIG. 6 shows that the length of data of 4 KB (8 sectors in the logical space) with the start address LBA "0x000_0000_0000" is PBA length "2" and the length of 512 bytes×2 sectors=1 KB. Consequently, according to the PBA length "2" and PBA "XXX", it can be determined that the data of 4 KB with the start address of LBA "0x000_0000_0000" is stored in an area of 1 KB from PBA "XXX" to "XXX+2" in a compressed manner.

As to the FM module described in Embodiment, the example where the data is stored in the compressed manner is described. However, the present invention is not limited to this example. The data is not necessarily stored in any compressed manner. In a case where the data is not stored in any compressed manner, the column of the PBA length 603 is not required in the logical-to-physical translation table 600.

(1-3) Second Management Table: Block Management Table

Subsequently, the block management table is described with reference to FIG. 7.

FIG. 7 shows the block management table 700.

The block management table 700 is stored in the memory area in the FM module 100, e.g., the RAM 122. For example, this table contains the PBA 701, chip number 702, block number 703, and amount of invalid PBA 704, for each PBA having a predetermined size.

The PBA 701 indicates the physical area in the FM group. In this Embodiment, the PBA is divided in units of blocks and managed. In FIG. 7, the PBA 701 indicates the leading address. For example, PBA "0x000_0000_0000" indicates the PBA range of "0x000_0000_0000" to "0x000_000F_FFFF". Although the PBA representing forms are different between FIGS. 6 and 7, the forms are the same in view of PBA.

The chip number 702 indicates the identification number of the FM 140 (chip). The block number 703 indicates the identification number of the block (physical block).

The amount of invalid PBA 704 indicates the amount of invalid PBA. The amount of invalid PBA is the amount of PBA area whose association with the logical space is canceled, that is, the total amount (total size) of invalid area (invalid pages). Conversely, PBA areas associated with the logical space are valid areas (valid pages). The invalid PBA area is inevitably caused when pseudo overwriting is realized in the nonvolatile memory where data cannot be overwritten. More specifically, when the data is updated, update data is written in another unwritten PBA area, and the PBA 602 and the PBA length 603 in the logical-to-physical translation table 600 are updated with the leading address of the PBA area that is the write destination of the update data and the PBA length of the update data. Consequently, the association of the PBA area that stores the pre-updated data with the logical space is canceled. In this Embodiment, the amount of invalid PBA (e.g., the number of invalid pages) is counted for each block, which is the minimum erase unit of FM. The block having a large amount of invalid PBA is selected as the reclamation target area (the migration source physical block in the case of reclamation) with a priority. According to the example of FIG. 7, the amount of invalid PBA of the block with the chip number "0" and the block number "0" is 160 KB.

In this Embodiment, reclamation is performed for the block having an amount of invalid PBA equal to or larger than a reclamation start threshold. In the reclamation, the valid data is migrated from the valid PBA area (valid page) in the migration source block (the block having an amount of invalid PBA equal to or larger than the reclamation start threshold) to another block. As a result, the valid PBA area becomes an invalid PBA area (i.e., the entire area of the migration source block becomes an invalid PBA area). Subsequently, an erase process is performed for the migration source block. As a result, the migration source block becomes an available block. Data migration (data copy) in the reclamation causes writing to the FM 140. Consequently, the deterioration of the FM 140 is advanced, and resources including the processor 123 and the bus bandwidth of the FM module 100 are consumed for data migration operation, thereby forming factors in performance reduction. It is thus desirable that data migration in the valid PBA area should be as little as possible. The FM controller 110 refers to the block management table 700, and selects a block having a large amount of invalid PBA 704 (including a large invalid PBA area) as an erase process target (migration source block) with a priority, which can reduce the amount of data to be migrated.

In this Embodiment, the management of the amount of invalid PBA is the management of the amount of area whose association with the logical space is canceled. However, the present invention is not limited to this management unit. For example, the amount of invalid data may be managed in units of the number of pages.

The block management table 700 has thus been described above.

(1-4) Write Command Process and Read Command Process

Subsequently, referring to FIGS. 2 to 5, the write command process and the read command process are described. Each of at least one of the command external process unit 119, the command division unit 113, the cache hit determination unit 111, the cache registration unit 112, the command internal process unit 120, and the copy DMA unit 121 records the processing situation in a command process log 132 every time the process is performed, as schematically shown in FIGS. 2 to 5. According to this function, in each of the multiple stages of write command process and the read command process, the processor calculates the command process log 132 in case a failure occurs, thereby allowing the failure spot to be determined. The command process log 132 is stored in, for example, the RAM 122, as shown in FIG. 1.

Each of at least one of the command external process unit 119, the command division unit 113, the cache hit determination unit 111, the cache registration unit 112, the command internal process unit 120, and the copy DMA unit 121 has a function of interrupting the processor 123 in case a failure is detected (e.g., timeout). The interrupted processor 123 identifies the failure spot by analyzing the command process log described above.

(1-4-1) Write Command Process

Figure 2:
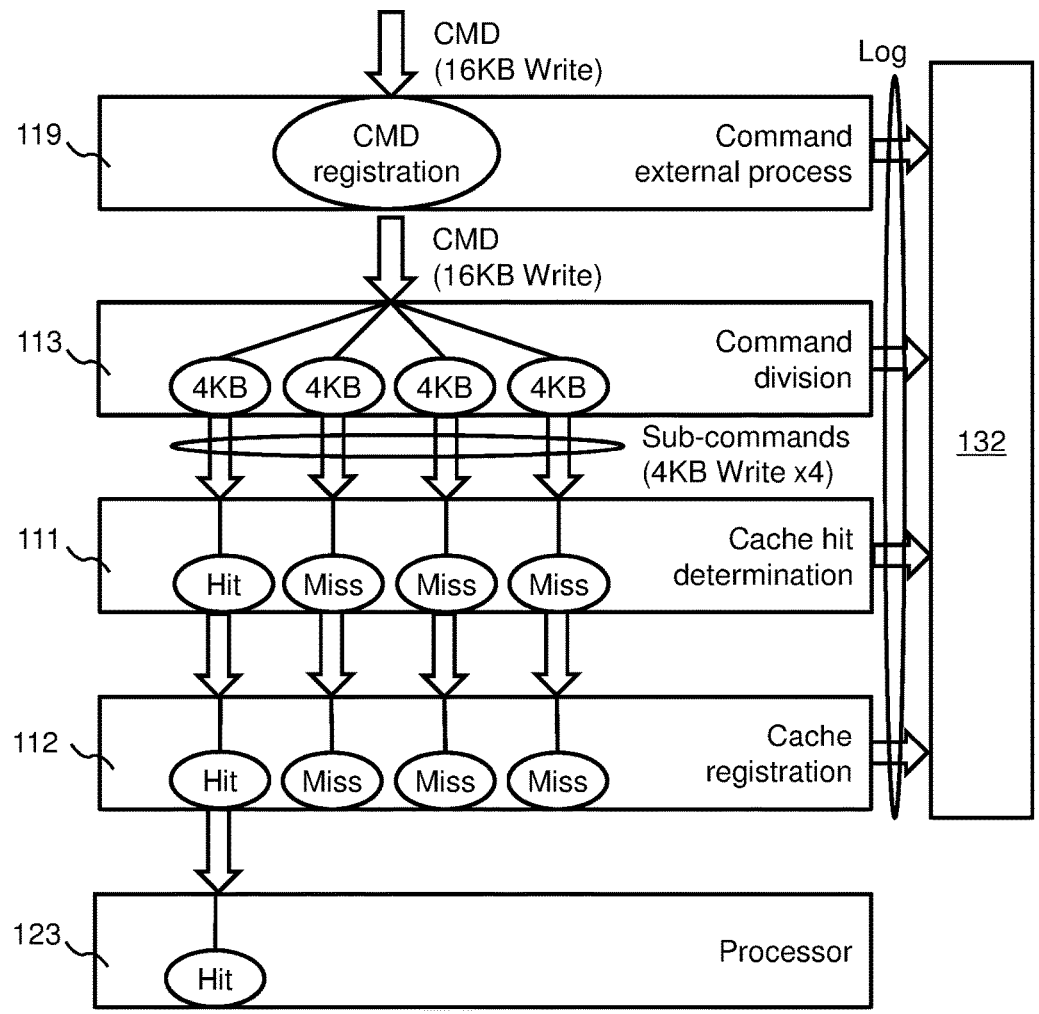
FIG. 2 shows a part of a write command process, that is, a write command receiving process.
Figure 3:
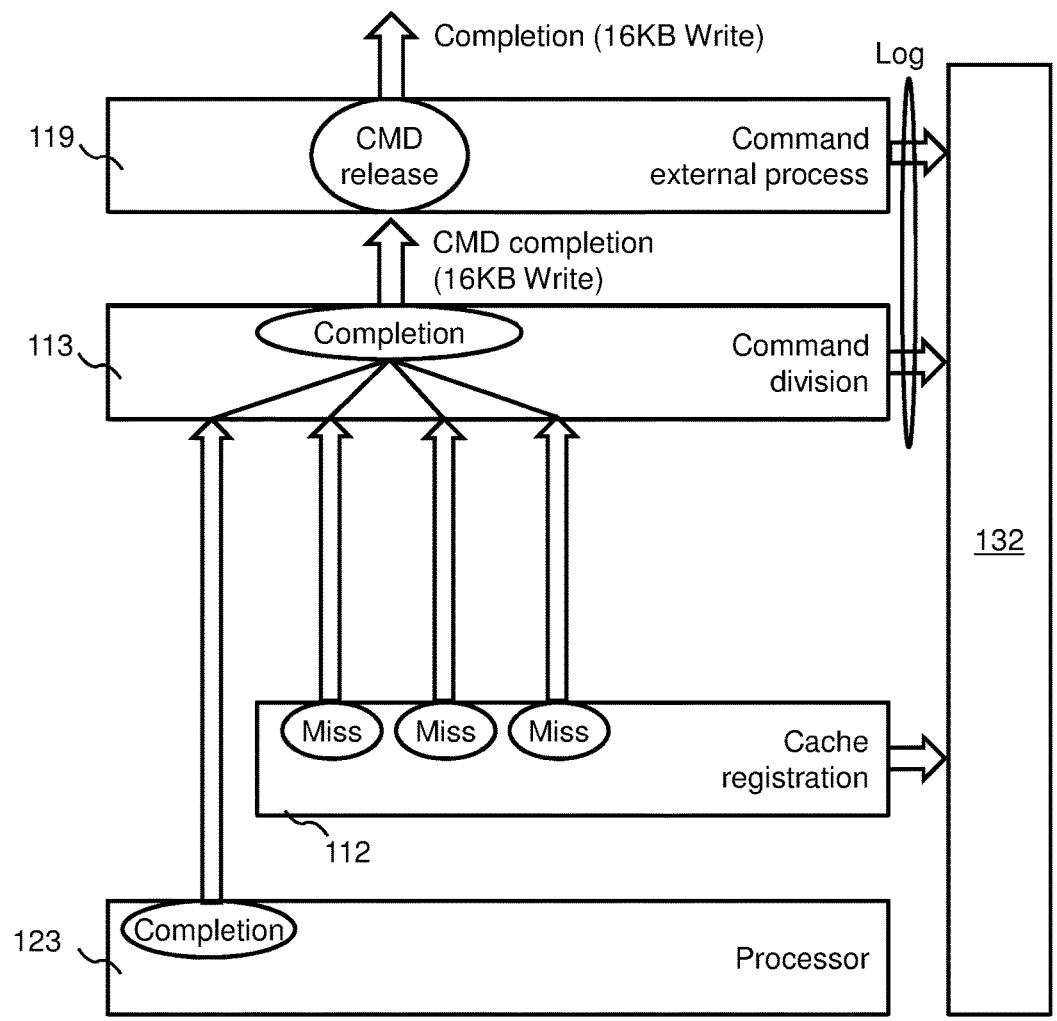
FIG. 3 shows the remaining part of the write command process, that is, a write command response process.

FIGS. 2 and 3 show the write command process. More specifically, FIG. 2 shows a part of the write command process, that is, a write command receiving process. FIG. 3 shows the remaining part of the write command process, that is, a write command response process.

As shown FIG. 2, the command external process unit 119 having received the write command from the higher-level apparatus registers the received write command in the internal area (e.g., register) of the unit 119. The command external process unit 119 sets the state of the registered write command to a state of waiting for completion notification. The command external process unit 119 transfers the registered write command to the command division unit 113. The reason why the command external process unit 119 registers the write command in the internal area is that the command external process unit 119, which is hardware, transmits the completion response to the higher-level apparatus (this reason is analogous to read command registration (see FIG. 4)). That is, the command external process unit 119 manages whether the completion notification about each write command received by the command external process unit 119 has already been transmitted or not. The write command about which the completion notification has been transmitted may be deleted from the command external process unit 119.

The command division unit 113 having received the write command from the command external process unit 119 divides the write command into sub-write commands, and registers the sub-write commands in the internal area (e.g., the register of the unit 113), for example. Here, the number of sub-write commands acquired from the write command may be a quotient (one in a case where the quotient is zero)

acquired by dividing the size of the write data by the internal management unit (the unit logical area in the logical space), that is, the page size. For example, in a case where the size of the write data associated with the write command is 16 KB and the internal management unit (page size) is 4 KB, the number of acquired sub-write commands may be 16/4=4. The command division unit 113 registers the association relationship between the write command and the sub-write commands in the internal area (e.g., register) of the unit 113, for example. The association relationship may be, for example, the combination of the ID (e.g., "A") of the write command and multiple IDs (e.g., "A-1", "A-2", "A-3" and "A-4") of the sub-write commands divided from the write command. The ID of the write command may be an ID contained in the write command from the higher-level apparatus, or an ID assigned by the FM controller 110 (e.g., the command external process unit 119 or the command division unit 113). The ID of the sub-write command may be, for example, an ID provided on the basis of the ID of the write command, or, for example, an ID assigned by the FM controller 110 (e.g., the command division unit 113). The command division unit 113 sets the state of each of the sub-write commands to a state of waiting for completion notification (response). The command division unit 113 transfers the divided sub-write commands to the cache registration unit 112. One sub-write command corresponds to one written sub-write data, and designates the LBA that is the write destination of one sub-write data, for example. The sub-write data is a part of the write data, and has the same size as the internal management unit (page size), for example. One sub-write data does not spread across two or more pages, but is written in a single page instead.

The reason why the command division unit 113 divides the write command into the sub-write commands is that the stored states of the write data can be different according to the internal management units (each sub-write data). In other words, the reason is that a cache hit (a data corresponds to the write destination LBA resides in the cache 114) and a cache miss (a data corresponding to the write destination LBA does not reside in the cache 114) are prevented from mixedly occurring for data stored in the same page. When every write target data causes a cache miss, the process by the processor 123 is not required. Unfortunately, when at least a part of write target data causes a cache hit, the process by the processor 123 is required. Consequently, it is desirable that a cache hit and a cache miss should be prevented from mixedly occurring for the data stored in the same page.

More specifically, for example, one sub-write data (data of 4 KB) in the write data of 16 KB can reside on the data cache 114. The remaining three sub-write data (data of 12 KB as a whole) can be stored in one or more FMs 140. In this case, a cache management table (not shown) is required to be updated for the sub-write data stored in the data cache 114. The cache management table may be information analogous to that on a cache determination table. On the other hand, it is only required that the sub-write data stored in the FM 140 is registered in the cache 114. The address of the cache area (an area in the cache 114) where the sub-write data is stored is not required to be notified to the processor 123. Thus, in the FM module 100, the state of the logical area (the area corresponding to the sub-write data) can be different according to the management unit (4 KB in the example). Consequently, in this Embodiment, the sub-write command for the sub-write data that has the same data size as the management unit is generated from the write command. The I/O hardware or the processor 123 having received the sub-write command is required to control only the state of the single sub-write command, and is not required to wait for the completion of another sub-write command in the write command that includes the sub-write command. As a result, a high performance is expected to be achieved. The process by the processor 123 is not required for the sub-write command in a situation where the process by the processor 123 is not required. As a result, the limitation on performance due to the processor processing performance bottleneck can be alleviated.

In a case where the size of the write data is equal to or smaller than the management unit (page size), the number of sub-write commands may be one and the sub-write commands may be write commands. In other words, in a case where the size of the write data is equal to or smaller than the management unit (page size), the command division unit 113 may transfer the write command from the command external process unit 119 to the cache hit determination unit 111.

The cache hit determination unit 111 having received multiple (or one) sub-write command(s) from the command division unit 113 performs cache hit determination for every received sub-write command (determines whether the sub-write data corresponding to the LBA designated by the sub-write command is registered in the cache 114 or not). More specifically, for example, in this Embodiment, the cache registration unit 112 registers the data in the cache 114, the cache hit determination unit 111 includes the cache hit determination table (not shown), and the cache hit determination unit 111 refers to the cache hit determination table to determine whether the sub-write data that is the target of the sub-write command resides in the cache 114 or not. The cache hit determination table may contain, for example, the combination of the address of the sub-cache area and the LBA (LBA belonging to the logical space) corresponding to the data in the sub-cache area. When the LBA designated by the sub-write command is registered in such a cache hit determination table, it is determined to be a cache hit. When the LBA designated by the sub-write command is not registered, it is determined to be a cache miss. As to the sub-write command, the cache hit indicates a state where the data associated with the LBA area (logical area) that is the target of the sub-write command is stored not in the FM 140 but in the data cache 114. As to the sub-write command, the cache miss indicates a state where the data associated with the LBA area (logical area) that is the target of the sub-write command is stored not in the data cache 114 but in the FM 140. The sub-write command determined to be a cache hit by the cache hit determination unit 111 is managed as a sub-write hit command thereafter. In the sub-write hit command, the address of the sub-cache area that is the storage destination of new sub-write data (sub-write data to be newly stored in the sub-cache area), and the address of the cache-hit sub-cache area (the sub-cache area that stores previous sub-write data (sub-write data updated with the new sub-write data)) are designated by the cache hit determination unit. On the other hand, the sub-write command determined to be a cache miss by the cache hit determination unit 111 is managed as a sub-write miss command thereafter. The sub-write hit command and the sub-write miss command are transferred from the cache hit determination unit 111 to the cache registration unit 112.

The cache registration unit 112 having received the sub-write command (the sub-write hit command and the sub-write miss command) from the cache hit determination unit 111 registers the LBA (LBA belonging to the logical space) designated by the sub-write command in the cache hit determination table for every sub-write command. The cache registration unit 112 notifies the processor 123 of only the sub-write hit command among the received sub-write commands, but does not notify the processor 123 of the sub-write miss command.

The processor 123 having received the sub-write hit command performs control according to the sub-write hit command. In the sub-write hit command, the address of the sub-cache area where the previous sub-write data is stored (previous sub-cache area), and the address of the sub-cache area that is the storage destination of the new sub-write data (new sub-cache area) are designated. The processor 123 identifies the previous sub-cache area on the basis of the sub-write hit command, and releases the identified sub-cache area. More specifically, for example, the processor 123 deletes the association between the LBA designated by the sub-write hit command and the address of the previous sub-cache area from the cache hit determination table.

After the process for the sub-write hit command, the processor 123 notifies the command division unit 113 of the completion of the sub-write hit command, as shown in FIG. 3. The cache registration unit 112 registers the sub-write data corresponding to the sub-write miss command in the data cache 114, and subsequently notifies the command division unit 113 of the completion of the sub-write miss command. In this Embodiment, the completion is notified at a stage where the sub-write data is stored not in the FM 140 but in the data cache 114. However, the present invention is not limited to this example. For example, after the data on the sub-write command is written in the FM 140, the completion may be notified to the command division unit 113.

As described above, the command division unit 113 holds the association relationship between the write command and the divided sub-write commands. The command division unit 113 monitors completion of all the sub-write commands that constitute the write command. Upon every receipt of the completion, the command division unit 113 sets the state of the sub-write command corresponding to the completion to a completed and received state. After the completion has been reported by the processor for all the sub-write commands that constitute the write command, the command division unit 113 notifies the command external process unit 119 of the completion of the write command.

The command external process unit 119 having received the command completion from the command division unit 113 transfers the completion of the write command to the higher-level apparatus. The completion notification (response to the write command) to be transmitted to the higher-level apparatus may be notification from the command division unit 113 or notification generated by the command external process unit 119.

Upon receipt of the write command from the higher-level apparatus, the command external process unit 119 may set a timer for the write command (starts time measurement), and if no completion notification has been received from the command division unit 113 in a predetermined time after receipt of the write command, the unit 119 may notify the higher-level apparatus of a timeout error. The command external process unit 119 receives multiple I/O commands from the higher-level apparatus and holds the commands, and may monitor the time using the timer described above for every I/O command.

The write command process in this Embodiment has thus been described above. According to the write command process, when multiple sub-read commands corresponding to the respective sub-write commands are stored in the cache 114, completion of the write command is notified to the higher-level apparatus. Consequently, improvement of the speed of write command process is expected.

(1-4-2) Read Command Process

Figure 4:
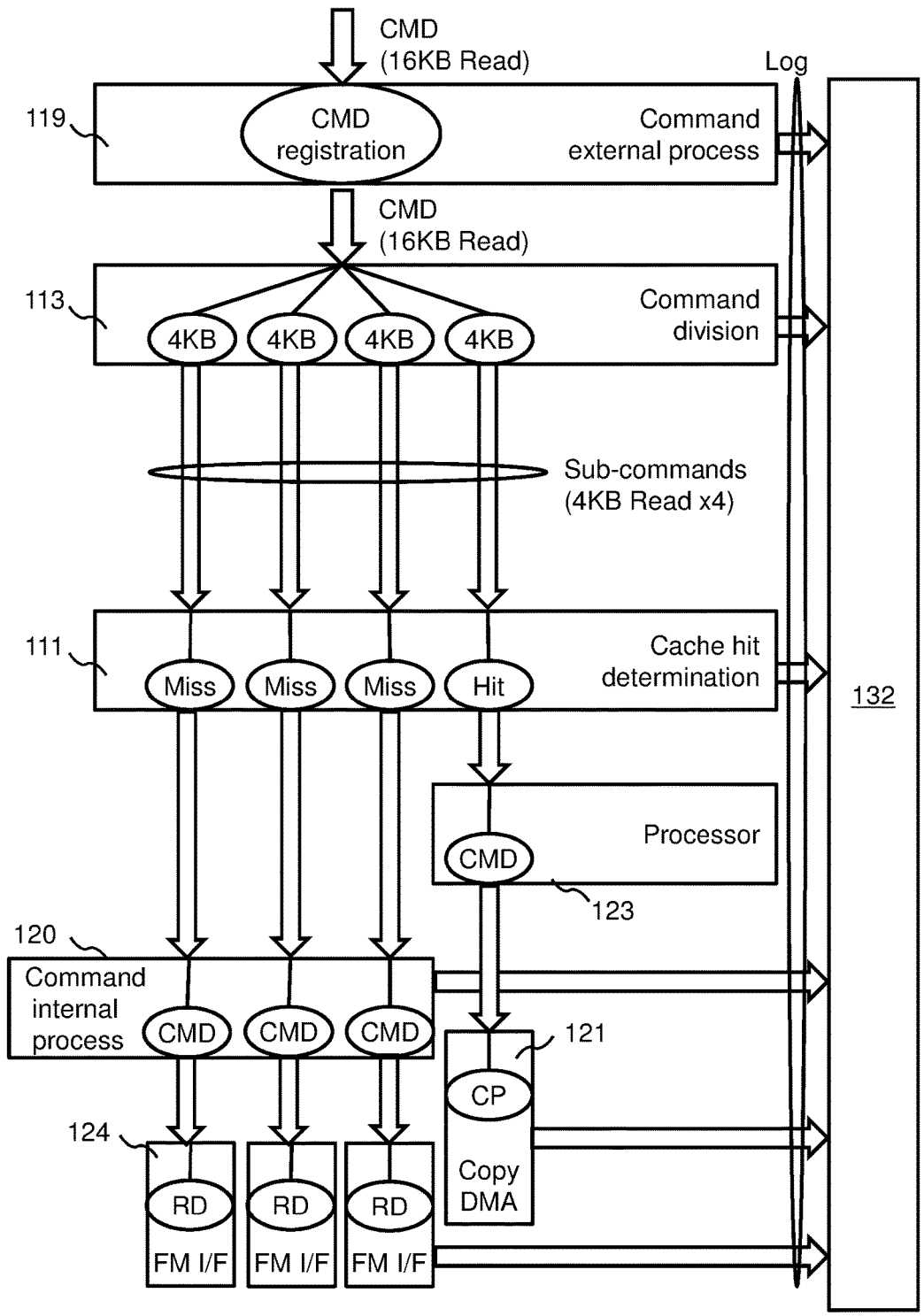
FIG. 4 shows a part of a read command process, that is, a read command receiving process.
Figure 5:
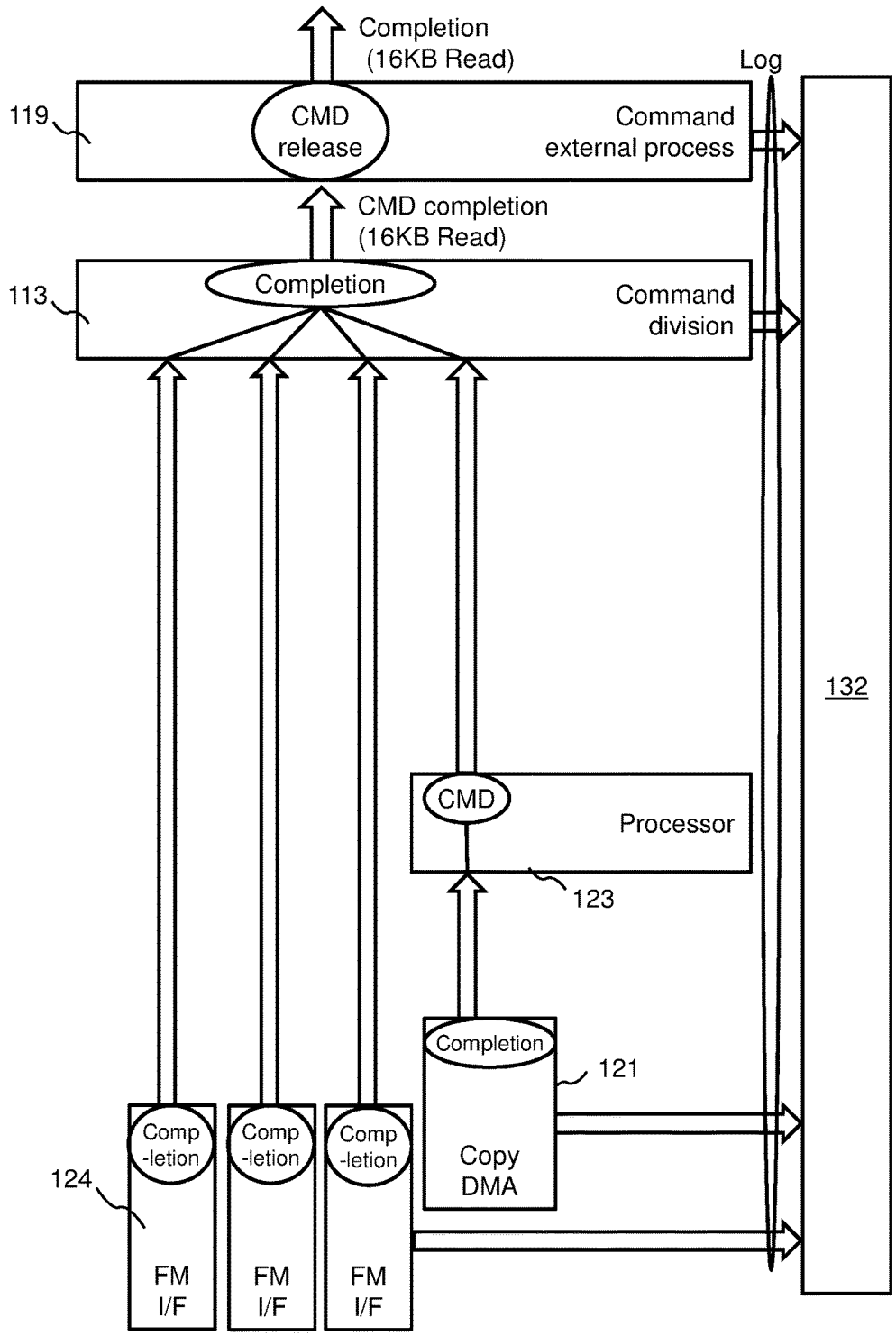
FIG. 5 shows the remaining part of the read command process, that is, a read command response process.

FIGS. 4 and 5 show the read command process. More specifically, FIG. 4 shows a part of the read command process, that is, a read command receiving process. FIG. 5 shows the remaining part of the read command process, that is, a read command response process.

As shown FIG. 4, the command external process unit 119 having received the read command from the higher-level apparatus registers the received read command in the internal area (e.g., register) of the unit 119. The command external process unit 119 sets the state of the registered read command to a state of waiting for completion notification. The command external process unit 119 transfers the registered read command to the command division unit 113.

The command division unit 113 having received the read command from the command external process unit 119 divides the read command into sub-read commands, and registers the sub-read commands in the internal area (e.g., the register of the unit 113). Here, the number of sub-read commands acquired from the read command may be a quotient (one in a case where the quotient is zero) acquired by dividing the size of the read data (data read according to the read command) by the internal management unit (page size). For example, in a case where the size of the read data associated with the read command is 16 KB and the internal management unit (page size) is 4 KB, the number of acquired sub-read commands may be 16/4=4. The command division unit 113 registers the association relationship between the read command and the sub-read commands in the internal area (e.g., register) of the unit 113, for example. The command division unit 113 sets the state of each of the sub-read commands to a state of waiting for completion notification (response). The command division unit 113 transfers the divided sub-read commands to the cache registration unit 112. One sub-read command corresponds to a read of one sub-read data, and designates the LBA that is the read source of one sub-read data, for example. The sub-read data is a part of the read data, and has the same size as the internal management unit (page size), for example. One sub-read data does not spread across two or more pages, but is read from a single page instead.

The reason why the command division unit 113 divides the read command into the sub-read commands is not only that the stored states (cache hit/cache miss) are different according to the management units as in the case of the write command described above but also in that there is a possibility that the multiple pages (multiple read source pages) associated with the LBA area designated by the read command may be distributed across the different FMs 140 connected to the different FM interfaces. The FM controller 110 manages the association relationship between the LBA and PBA according to internal management unit. There is a possibility that even in the case of sequential LBA areas, the actual data may be distributed across the different FMs 140 (and the data cache 114). Accordingly, to complete one read command, the multiple FM interfaces 124 (or the copy DMA unit 121) can be required to be controlled in parallel. Thus, the read command is divided into the sub-read commands on the basis of the internal management unit.

The cache hit determination unit 111 having received the multiple (or one) sub-read command(s) from the command division unit 113 performs cache hit determination for every sub-read command. More specifically, the cache hit determination unit 111 refers to the cache hit determination table, and determines whether the sub-read data that is the target of the sub-read command resides in the cache 114 or not. As to the sub-read command, the cache hit indicates a state where the data associated with the LBA area (logical area) that is the target of the sub-read command is stored not in the FM 140 but in the data cache 114. As to the sub-read command, the cache miss indicates a state where the data associated with the LBA area (logical area) that is the target of the sub-read command is stored not in the data cache 114 but in the FM 140. The sub-read command determined to be a cache hit by the cache hit determination unit 111 is subsequently managed as a sub-read hit command. The cache hit determination unit 111 designates the address of the cache-hit sub-cache area in the sub-read hit command. On the other hand, the sub-read command determined to be a cache miss by the cache hit determination unit 111 is subsequently managed as a sub-read miss command.

The cache hit determination unit 111 selects the I/O command of the transfer destination of the sub-read command according to whether the sub-read command is the sub-read hit command or the sub-read miss command. In the example shown in FIG. 4, the sub-read miss command is transferred to the command internal process unit 120. The sub-read hit command is transferred to the processor 123.

In this Embodiment, the reason why pieces of I/O hardware to which the sub-read miss command and the sub-read hit command are to be notified are separated from each other is the difference of occurrence frequencies of the sub-read miss and sub-read hit and the complexity of the sub-read hit process.

The difference of occurrence frequencies of the sub-read miss and sub-read hit depends on the ratio of the capacity of the data cache 114 to the capacity of the FM group (group of multiple FMs 140) and on the locality of the LBA designated to the FM module 100 by the higher-level apparatus. For example, in this Embodiment, the difference between the capacity of the data cache 114 and the capacity of the FM group is significantly large. More specifically, for example, the capacity of the data cache 114 is several hundred megabytes, and the capacity of the FM group is several terabytes. In such a configuration, when a read request having low locality of the LBA is received from the higher-level apparatus, most of the sub-read commands acquired from the read command become sub-read miss commands. That is, a much smaller number of sub-read hit commands occur than the number of sub-read miss commands. Consequently, to improve the speed of read performance of the FM module 100, the sub-read miss commands are required to be processed by high-speed dedicated hardware. In other words, in this Embodiment, improvement of read performance speed is expected better in the case of cache miss. In this view, it is desired that the data cache 114 should be a temporary memory area, such as a buffer, where read data does not remain.

It is conceivable that it is desirable to process not only the sub-read miss command but also the sub-read hit command in the I/O hardware also in view of improvement in the performance of the FM module 100. There is a possibility that the sub-read hit command conflicts with another process. For example, there is a possibility that the sub-cache area that is the target area of the sub-read hit command is an area where data is being transferred (hereinafter, this operation is represented as destage) from the data cache 114 to the FM 140 in order to write the data to the FM 140. If no consideration were paid for the conflict of the destage process with the process of the sub-read hit command, the sub-cache area would be released at a time point of completion of the data transfer to the FM 140. Consequently, if the sub-read command were determined to be a cache hit and subsequently the process were continued without consideration of conflict, the possibility would arise that after deletion of data from the sub-cache area, the data would be read. In other words, the possibility would arise at the time point of data reading from the sub-cache area corresponding to the sub-read hit command, the data corresponding to the sub-read hit command would not reside in the sub-cache area.

To eliminate the possibility as described above, complicated conflict management of various operations to be performed by the FM controller 110 is performed by the processor 123 in this Embodiment. For example, to avoid conflict between the process of the sub-read hit command and the destage process, the processor 123 performs exclusive control, such as "detecting that the sub-cache area corresponding to the sub-read hit command is the target of the destage process" or "acquiring the lock of the sub-cache area corresponding to the sub-read hit command, and prohibiting release of the sub-cache area (deletion of the data from the sub-cache area) in the destage process being executed in parallel".

As described above, the sub-read hit command that has the possibility of conflict and requires the complicated exclusive control is transferred to the processor 123. This negates the need to develop hardware for managing the complicated conflict, and reduces the risk of developing hardware, where bug correction is difficult, and reduction in development time period can be expected.

It is conceivable that designating the processor 123 in charge of the process of the sub-read hit command makes the processing performance of the processor 123 a bottleneck, which might reduce the read performance of the FM module 100. However, as described above, in the environment where the higher-level apparatus can execute the I/O pattern having low locality of LBA, the occurrence frequency of the sub-read hit command is lower than the occurrence frequency of the sub-read miss command. Consequently, the reduction in performance of the FM module can be alleviated.

The command internal process unit 120 receives the sub-read miss command from the cache hit determination unit 111. The command internal process unit 120 identifies the PBA corresponding to the LBA designated by the sub-read miss command in the logical-to-physical translation table 600 with respect to every sub-read miss command, generates the command of reading data from the FM 140 and transfers the command to the FM interface 124 connected to the physical area corresponding to the identified PBA. Two or more FM interfaces 124 connected to two or more read source physical areas (pages) corresponding to two or more sub-read miss commands can be activated in parallel.

Meanwhile, the processor 123 receives the sub-read hit command from the cache hit determination unit 111. The processor 123 performs the exclusive control for the sub-cache area designated by the sub-read hit command, and subsequently issues a command to the copy DMA unit 121. This is performed in order to copy the data in the sub-cache area to a read buffer area (an area where the read data is temporarily stored before transfer of the read data to the higher-level apparatus). In this Embodiment, the sub-cache area and the read buffer area are different areas. Alternatively, the data cache 114 and the read buffer area may be integrated. In this case, the copy DMA unit 121 is unnecessary.

In this Embodiment, the data read from the FM group according to the read command is not registered in the data cache 114. However, the present invention is not limited to this example. For example, the sub-read data read from the FM 140 may be transferred to the data cache 114, and the LBA designated by the sub-read command may be registered in the cache hit determination table. Accordingly, the LBA area that frequently becomes the read source may be read not from the FM 140 but from the sub-cache area.

In the operation shown in FIG. 4, as a result of the process of the sub-read command (the sub-read hit command and the sub-read miss command), the completion notification is transferred from the FM interface 124 and the copy DMA unit 121 to which the command for data transfer has been notified.

More specifically, as shown in FIG. 5, the FM interface 124 where the process of command for reading the data from the FM 140 notifies the command division unit 113 of the completion notification that contains the sub-read data designated by the sub-read miss command and read from the FM 140.

The copy DMA unit 121 where the data transfer from the sub-cache area to the read buffer has been completed notifies the transfer completion to the processor 123 having issued the command to the copy DMA unit 121. The processor 123 having received the completion notification from the copy DMA unit 121 performs exclusive control for the sub-cache area corresponding to the sub-read hit command, and subsequently notifies the command division unit 113 of the completion of the sub-read hit command. In Embodiment, the copy DMA unit 121 temporarily notifies the processor 123 of the completion, and the thus notified processor 123 notifies the command division unit 113 of the completion. However, the present invention is not limited to this example. For example, the copy DMA unit 121 may notify the command division unit 113 and the processor 123 of the sub-read hit command.

The command division unit 113 is waiting for the completion notification for all the sub-read commands created from the single read command. If the completion notification is not acquired even after the timeout threshold is exceeded (if the completion notification is not received in a predetermined time after the sub-read command is issued), the command division unit 113 may write error information in the command process log 132 and interrupt the processor 123.

The command division unit 113 having received the completion notification from the FM interface 124 and the processor 123 receives the completion notification for all the sub-read commands that constitute the read command, and subsequently transfers the completion notification of the read command to the command external process unit 119.

The command external process unit 119 having received the completion notification of the read command from the command division unit 113 transfers the completion notification for notifying the higher-level apparatus of the completion of the read command process. The completion notification (response to the read command) to be transferred to the higher-level apparatus may be notification from the command division unit 113 or notification generated by the command external process unit 119. The completion notification transferred to the higher-level apparatus may contain the read data made up of the sub-read data respectively corresponding to all the sub-read commands that constitute the read command.

(1-5) Processes of Processor 123

Subsequently, the processes of the processor 123 are described. The main processes of the processor 123 of this Embodiment include: a process to be executed on the basis of the I/O command from the higher-level apparatus, such as the sub-write hit command process and the sub-read hit command process; and a process to be executed asynchronously to (independently of) the command from the higher-level apparatus, such as the destage process and the reclamation process. With respect to, among these processes, the process (internal process) to be executed asynchronously to the command from the higher-level apparatus, such as the destage process and the reclamation process, the completion is not notified to the higher-level apparatus. Consequently, the internal process is a process incapable of being grasped by the higher-level apparatus.

(1-5-1) Process of Processor 123: Sub-Write Hit Command Process

Among the processes of the processor 123, first, the sub-write hit command process is described with reference to FIG. 8.

Figure 8:
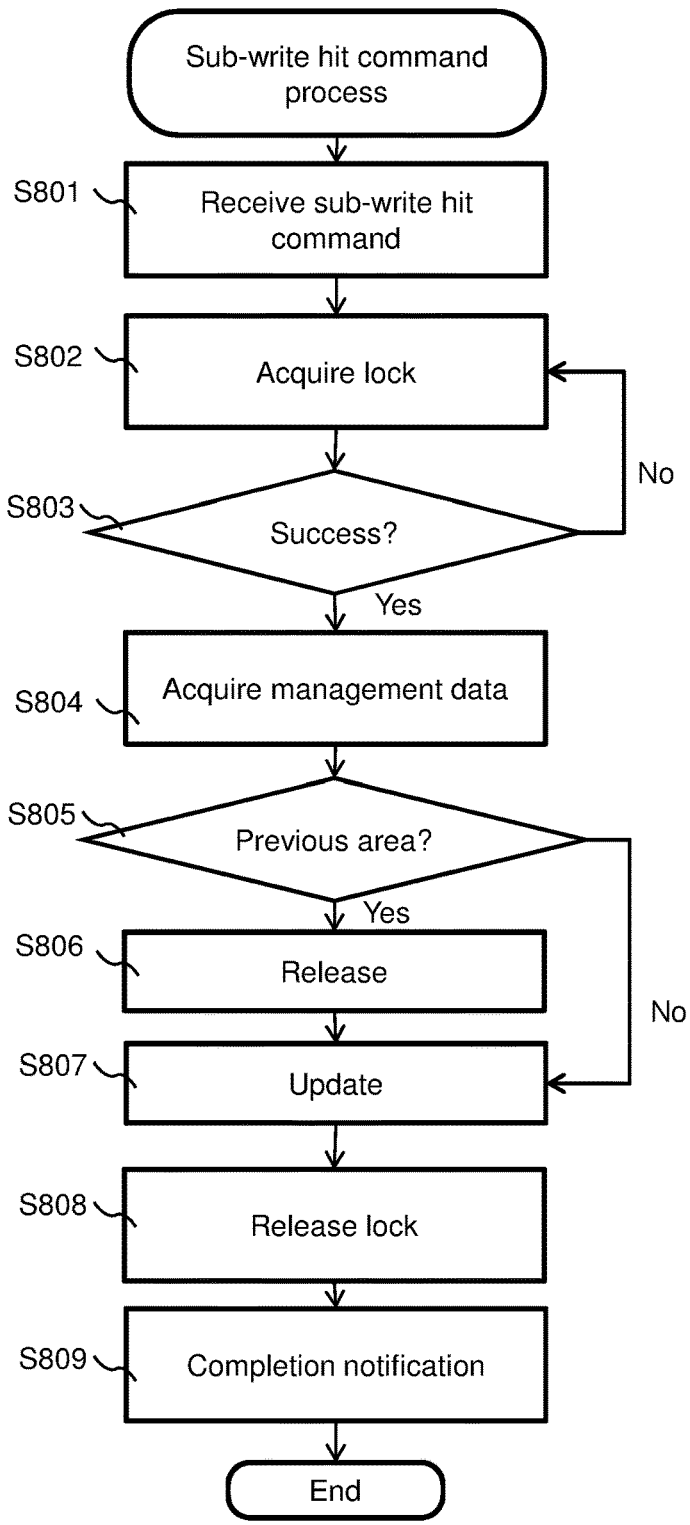
FIG. 8 is a flowchart of a sub-write hit command process.

FIG. 8 is a flowchart of a sub-write hit command process.

In S801, the processor 123 receives the sub-write hit command from the cache hit determination unit 111. Here, the processor 123 identifies the previous sub-cache area and the new sub-cache area on the basis of the received sub-write hit command.

In S802, the processor 123 tries to acquire the lock of the sub-cache area identified in S801. In this step, the processor 123 tries to acquire the lock on the basis of the management table held by the FM controller 110.

In S803, the processor 123 determines whether the lock has been acquired. If the lock has not been acquired in this step, the processor 123 can determine that the sub-cache area identified in S801 is in use in another process, and causes the processing to transition to S802, thus trying to acquire the lock until the completion of the use in the other process. On the other hand, if the lock has been acquired, the processing transitions to S804.

In S804, the processor 123 acquires the management data on the hit sub-area (the cache-hit sub-cache area).

In S805, the processor 123 refers to the management data (including the LBA corresponding to the data stored in the hit sub-area) acquired in S804, and determines whether the hit sub-area is the previous sub-cache area or not. In the FM module 100, there is a possibility that the data in the hit sub-area may be changed by another process. In S805, the processor 123 determines whether the area is the previous sub-cache area or not.

In a case where the determination result in S805 is affirmative (more specifically, the LBA corresponding to the hit sub-area where the lock is acquired is identical to the LBA designated by the sub-write hit command), the processing transitions to S806. On the contrary, in a case where the determination result in S805 is negative (more specifically, the LBA corresponding to the hit sub-area where the lock is acquired is different from the LBA designated by the sub-write hit command), this is a case where the hit sub-area is caused to be what is not the previous sub-cache area by another process, and the processing transitions to S807.

In S806, the processor 123 releases the previous sub-cache area. Consequently, the previous sub-cache area can be dealt with as the sub-cache area in another process.

In S807, the processor 123 registers the address of the new sub-cache area in the cache management table.

In S808, the processor 123 releases the lock of the hit sub-area. This release process allows the released area to be used as the sub-cache area in another process (e.g., the destage process or the sub-read hit command process).

In S809, the processor 123 notifies the command division unit 113 of the completion of the sub-write hit command received in S801.

The sub-write hit command process has thus been described above.

(1-5-2) Process of Processor: Sub-Read Hit Command Process

Subsequently, the sub-read hit command process is described with reference to FIG. 9.

Figure 9:
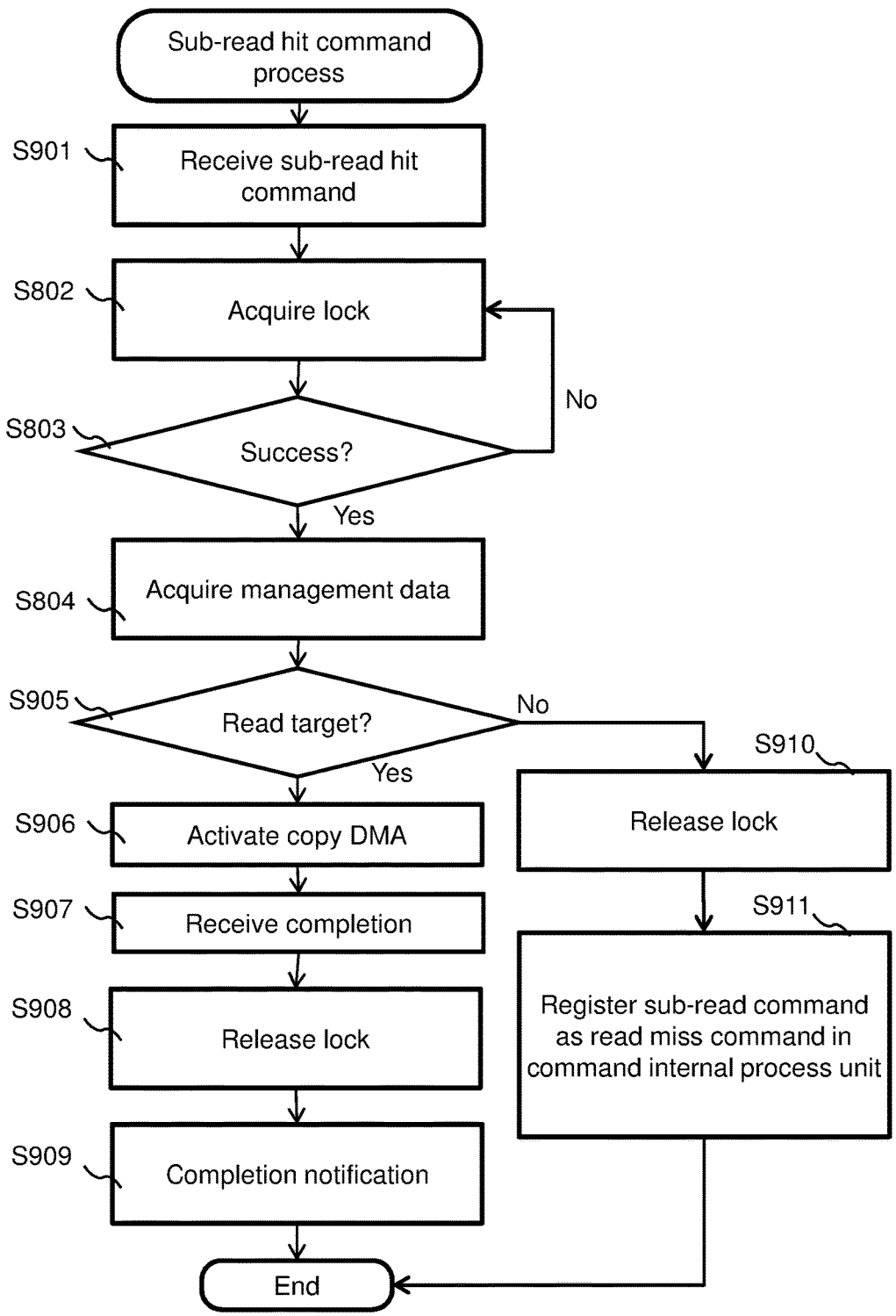
FIG. 9 is a flowchart of a sub-read hit command process.

FIG. 9 is a flowchart of the sub-read hit command process.

In S901, the processor 123 receives the sub-read hit command from the cache hit determination unit 111. Here, the processor 123 identifies the sub-cache area on the basis of the received sub-read hit command. In S902, the processor 123 tries to acquire the lock of the sub-cache area identified in S901. In S903, the processor 123 determines whether the lock has been acquired. In S904, the processor 123 acquires the management data on the hit sub-area (the cache-hit sub-cache area). In S905, the processor 123 refers to the management data (including the LBA corresponding to the data stored in the hit sub-area) acquired in S904, and determines whether the hit sub-area is the sub-cache area where the sub-read data corresponding to the sub-read hit command is stored or not. When the determination result in S905 is affirmative, the processing transitions to S906. When the determination result in S905 is negative, the processing transitions to S910.

In S906, as the processor 123 has determined that the sub-read data corresponding to the sub-read hit command is stored in the hit sub-area in S905, the processor 123 generates a command for the copy DMA unit 121 to copy the data in the hit sub-area to the read buffer area, and transmits the command to the copy DMA unit 121, thus activating the copy DMA unit 121.

In S907, the processor 123 receives the completion notification from the copy DMA unit 121 activated in S906. According to the receipt of the completion notification, it is determined that the sub-read data corresponding to the sub-read hit command is stored in the read buffer area. In the FM module 100 of this Embodiment, the multiple sub-read data respectively corresponding to the sub-read commands divided from the read command are stored in the read buffer area, and the command division unit 113 having confirmed the completion of all the sub-read commands activates data transfer to the higher-level apparatus. Consequently, according to the fact that the sub-read data has been stored in the read buffer area, the data transfer process that is the sub-read hit command is completed.

In S908, the processor 123 releases the lock of the hit sub-area. In S909, the processor 123 notifies the command division unit 113 of the completion of the sub-read hit command received in S901.

In S910, as the processor 123 has determined that the sub-read data corresponding to the sub-read hit command is not stored in the hit sub-area, the processor 123 releases the lock of the hit sub-area.

In S911, the processor 123 registers the sub-read hit command as the sub-read miss command in the command internal process unit 120. This is because it is determined that the cache miss has already occurred for the sub-read hit command received in S901, no sub-read data resides in the hit sub-area, and the sub-read data is stored in the FM 140. In this case, the command internal process unit 120 issues a command for the FM interface 124. Upon completion of data transfer by the FM interface 124 from the FM 140 to the read buffer area, the FM interface 124 notifies the command division unit 113 of the completion. This negates the need of the completion notification from the processor 123 to the command division unit 113.

The sub-read hit command process has thus been described above.

(1-5-3) Process of Processor 123: Destage Process

Subsequently, the destage process is described with reference to FIG. 10.

Figure 10:
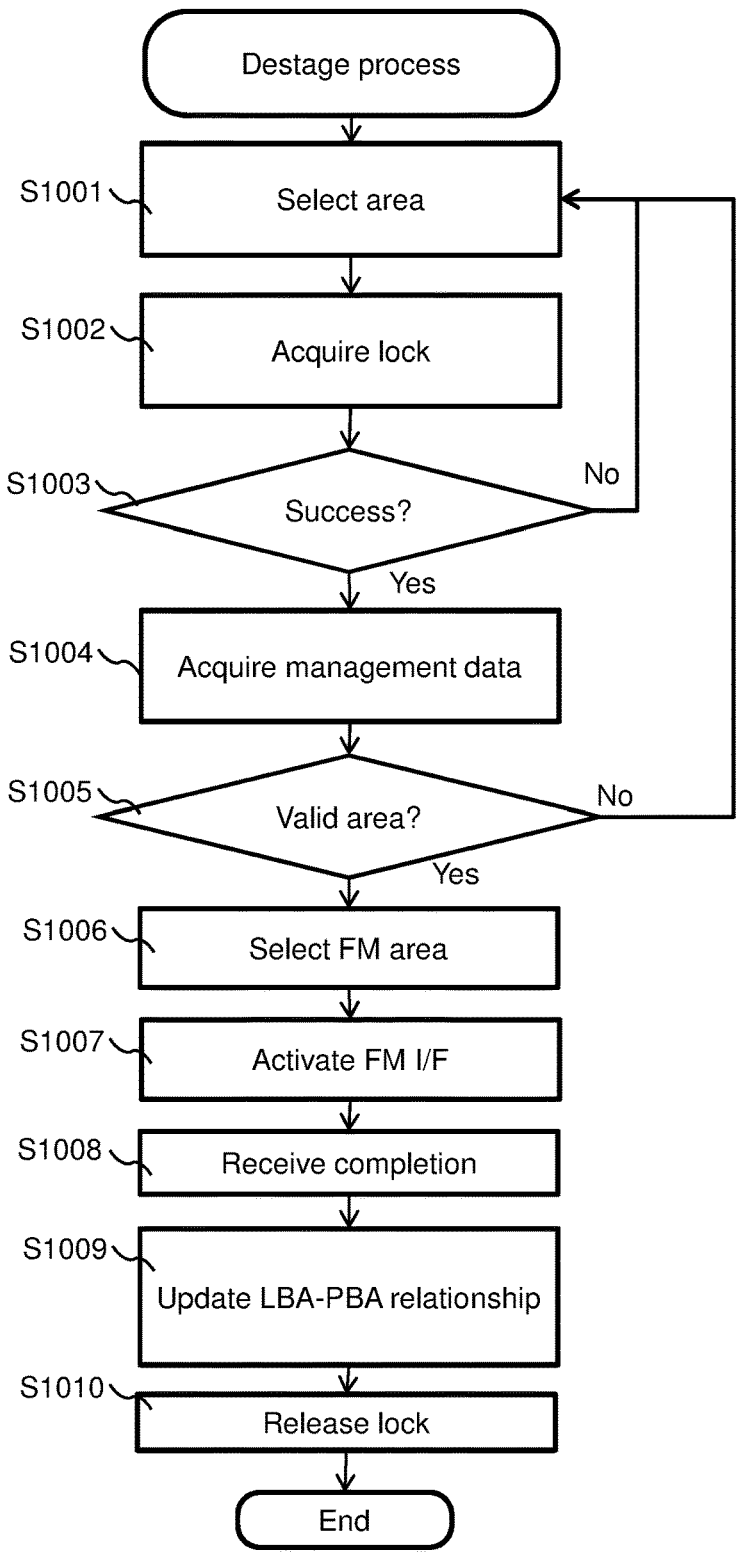
FIG. 10 is a flowchart of a destage process.

FIG. 10 is a flowchart of a destage process.

The destage process is periodically activated. However, the destage timing is not limited to periodic one. For example, the processor 123 may monitor the use situation of the data cache 114, and when the amount of available area in the data cache 114 becomes equal to or smaller than a threshold, the processor 123 may activate the destage process to release the sub-cache area.

In S1001, the processor 123 selects the sub-cache area that is the destage target. The processor 123 refers to the cache management table, and selects multiple (or one) sub-cache area(s) as the destage target. Here, the LBA (LBA belonging to the logical space) corresponding to the destage target data is acquired from the cache management table.

In S1002, the processor 123 tries to acquire the lock of each of the sub-cache areas selected as the destage target in S1001.

In S1003, the processor 123 determines whether the lock can be acquired. The processor 123 refers to a lock management table (not shown) that indicates the relationship between the sub-cache area and the presence or absence of the lock, and determines whether the destage target area selected in S1001 has become allowed to be dedicated (lock has been released). When the amount of the sub-cache area without lock is less than a predetermined amount, the processing transitions to S1001 in order to cause another sub-cache area to serve as the destage target area. On the contrary, when the amount in the sub-cache area without lock is equal to or larger than the predetermined amount, the processing transitions to S1004.

In S1004, the processor 123 acquires the management data on the multiple destage target areas selected in S1001.

In S1005, the processor 123 confirms that the multiple destage target areas selected in S1001 are valid. In this Embodiment, there is a possibility by the time the lock of the area being the destage target in S1001 is acquired in S1003, the lock is released by another process (e.g., in a case where the processor 123 is a multi-core processor, the destage process executed by another core). The processor 123 refers to the management data in the sub-cache area whose lock is acquired, thus determining that the destage target area is valid. When it is determined to be valid, the processing transitions to S1006. On the contrary, when it is determined to be invalid, the processing transitions to S1001 in order to reserve the destage target area.

In S1006, the processor 123 selects the destage destination FM area (a physical area in the FM). The processor 123 refers to the internal management table (e.g., the block management table 700 shown in FIG. 7), and determines multiple FM areas that serve as the destage destination (transfer destination) of the data in the sub-cache area.

In S1007, the processor 123 generates a command for writing for the FM interface 124 coupled to the FM area selected in S1006, and activates the command.

In S1008, the processor 123 receives completion notification from each of the FM interfaces 124 activated in S1006.

In S1009, the processor 123 updates the logical-to-physical translation table 600. The processor 123 associates the LBA acquired in S1001 with the PBA area (FM area) that is the destage destination.

In S1010, the processor 123 releases the lock of the sub-cache area selected in S1001. After the lock release, the released sub-cache area is available in another process, such as the sub-write hit command process and the read hit command process.

The destage process has thus been described above.

(1-5-4) Process of Processor: Reclamation Process

Subsequently, the reclamation process is described with reference to FIG. 11.

Figure 11:
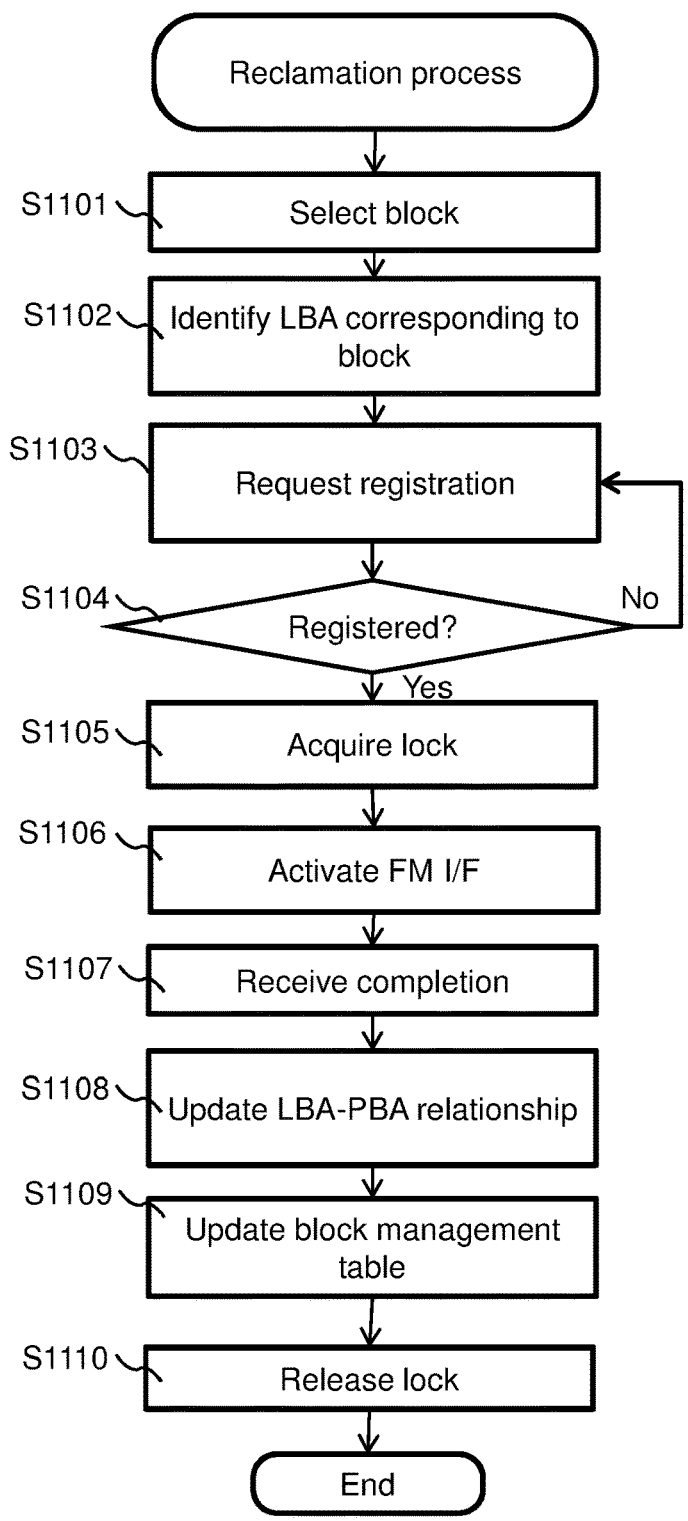
FIG. 11 is a flowchart of a reclamation process.

FIG. 11 is a flowchart of the reclamation process.

In S1101, the processor 123 selects the PBA area (migration source block) that is the reclamation target. The processor 123 refers to the block management table 700, and selects a block having a relatively large amount of invalid PBA as the migration source block. This is for allowing the amount of data migrated in the reclamation process to be reduced.

In S1102, the processor 123 identifies the LBA associated with the PBA area (block) selected in S1101, from the logical-to-physical translation table 600. Alternatively, the association relationship between LBA and PBA may be registered in a management table other than the logical-to-physical translation table 600, and the LBA may be identified from the other table.

In S1103, the processor 123 requests that the cache registration unit 112 should register the LBA identified in S1102 into the cache registration table and reserve the sub-cache area for storing the data associated with the LBA.

In S1104, the processor 123 determines whether what is requested to the cache registration unit 112 in S1103 has been executed or not. When the determination result in S1104 is affirmative, the processing transitions to S1105. When the determination result in S1104 is negative (e.g., a case where the reservation has not been performed because the available sub-cache area is exhausted), the processing transitions to S1103.

In S1105, the processor 123 acquires the lock of the sub-cache area reserved in S1003.

In S1106, the processor 123 generates a command for the FM interface 124 concerned in order to transfer the valid data in the migration source block to the sub-cache area reserved in S1103, and activates the command. Thus, the valid data is transferred from the migration source block to the sub-cache area.

In S1107, the processor 123 identifies the completion of data transfer activated in S1106. This completion indicates that the valid data in the migration source block is stored in the sub-cache area. Consequently, the process of the I/O command that designates the LBA associated with the migration source block can be supported by the data stored in the sub-cache area.

In S1108, the processor 123 deletes the combination of the PBA of the migration source block and the LBA associated therewith. This is because the valid data in the migration source block has been stored in the sub-cache area in S1107.

In S1109, the processor 123 updates the block management table 700. As the processor 123 has deleted the LBA/PBA combination (association) in S1108, all the PBAs of the migration source block are invalid PBAs. Accordingly, the processor 123 updates the block management table 700, and notifies another process that the migration source block can be erased. Although the detailed description is omitted, a job for erasing other than the reclamation process is operating in parallel in this Embodiment. This job refers to the block management table 700, selects the block where all the PBAs are invalid PBAs, and executes the erase process for the selected block.

In S1110, the processor 123 releases the lock of the sub-cache area.

The reclamation process has thus been described above. The FM controller 110 stores both the data for reclamation and the write data from the higher-level apparatus in the FM 140 through the destage process. Thus, at a stage where the valid data in the migration source block is stored in the sub-cache area, the reclamation process is finished.

The processes executed by the FM module 100 have thus been described above. As described above, in a case where the conflict of the process area is assumed to arise in each of processes that include the destage process, the reclamation process, the sub-write hit command process, and the sub-read hit command process, a mediate process therefor is processed by the embedded processor 123, thereby allowing complicated processes to be described in software (computer programs). The sub-read miss command and the sub-write miss command, which have higher occurrence frequencies than the sub-read hit command process and the sub-write hit command process have, are executed only in hardware, thereby allowing the high performance to be achieved. As a result, even without complicated hardware for performing the conflict process, the sub-read miss command can be processed at high speed, thus improving the performance of the read command process of the FM module 100. Likewise, even without complicated hardware for performing the conflict process, the sub-write miss command can be performed at high speed, which can reduce the write response time to the higher-level apparatus (the response time of the write command process). Even in a case where the sub-I/O command (sub-write command/sub-read command) is processed in hardware, in case a failure occurs in the process in the hardware, a log (e.g., failure information) is recorded in the command process log 132 by the hardware. Consequently, at least one of the failure site (e.g., a piece of hardware where the failure occurs) and failure details can be acquired from the embedded processor 123 in case the failure occurs.

The Embodiment has thus been described above. However, this is an example for describing the present invention, and it is not intended to limit the scope of the present invention only to this Embodiment. The present invention can be executed in various other modes. For example, in Embodiment, it is determined whether the processor processes the command (sub-command) or not according to the cache hit/miss. However, the reference of whether the processor processes the command (sub-command) or not is not necessarily limited thereto. For example, the FM group includes multiple high-speed physical areas (e.g., SLC (Single Level Cell) pages), and multiple low-speed physical areas (e.g., MLC (Multi Level Cell) pages). The logical space (LBA range) is divided into a high-speed logical area that is a logical area to which the high-speed physical area is allocated, and a low-speed logical area that is a logical area to which the low-speed physical area is allocated. In this case, the process of the I/O command where the LBA belonging to the high-speed logical area is designated is performed by the I/O hardware but not by the processor 123.

The process of the I/O command where the LBA belonging to the low-speed logical area may be performed by not only by the I/O hardware but also by the processor 123.

REFERENCE SIGNS LIST

100: FM module 110: FM controller 140: FM

The invention claimed is:

1. A semiconductor memory device, comprising:
a memory controller including a processor configured to process at least a part of an I/O (Input/Output) command from a higher-level apparatus when the part of the I/O command satisfies a predetermined condition, and one or more hardware logic circuits, which are different from the processor, and are configured to process the entire I/O command when the I/O command does not satisfy the predetermined condition; and
a memory element group that is one or more semiconductor memory elements configured to store data input and output by the memory controller, the data being at least a part of I/O target data associated with the I/O command,
wherein the memory controller comprises a temporary memory area, and
wherein the predetermined condition is satisfied when at least a part of the I/O target data is stored in the temporary memory area.

2. The semiconductor memory device according to claim 1, wherein
the one or more hardware logic circuits include:
a command division unit that is a hardware logic circuit configured to divide the I/O command into a plurality of sub-I/O commands; and
a determination unit that is a hardware logic circuit configured to determine, for each of the sub-I/O commands, whether the sub-I/O target data associated with the sub-I/O command is stored in the temporary memory area or not, and
wherein the sub-I/O command(s) for which the corresponding sub-I/O target data is determined to be stored in the temporary memory area is processed by the processor.

3. The semiconductor memory device according to claim 2, wherein
the memory controller is configured to manage, for each of unit logical areas into which a logical space to be provided for the higher-level apparatus is divided to have a predetermined size, an association relationship between a logical address of the unit logical area and a physical address of the memory element group, and
the command division unit is configured to divide the I/O command into the sub-I/O commands for I/O of the sub-I/O target data having a size identical to the predetermined size.

4. The semiconductor memory device according to claim 2, wherein
the memory element group includes a plurality of physical areas, and is configured to input and output data in units of the physical areas, and
the command division unit is configured to divide the I/O command into the sub-I/O commands for I/O of the sub-I/O target data having a size identical to a size of the physical area.

5. The semiconductor memory device according to claim 2, wherein
the memory controller comprises a plurality of memory element interfaces,
a plurality of sub memory element groups are respectively coupled to the plurality of memory element interfaces,
each of the sub memory element groups is one or more memory elements,
the I/O command is a read command,
the plurality of sub-I/O commands are respectively a plurality of sub-read commands, and
the one or more hardware logic circuits include a command internal process unit that is a hardware logic circuit configured to activate in parallel two or more memory element interfaces so as to read two or more sub-read data respectively from the two or more physical areas in parallel, the memory element interfaces being respectively coupled to two or more physical areas respectively corresponding to two or more sub-read commands.

6. The semiconductor memory device according to claim 2, wherein
the I/O command is a read command,
the plurality of sub-I/O commands are respectively a plurality of sub-read commands,
the one or more hardware logic circuits include a command internal process unit that is a hardware logic circuit configured to read sub-read data from a physical area corresponding to the registered sub-read command,
the processor is configured to perform another process that is a process that includes deleting or changing data in the temporary memory area in parallel to a process of the sub-read command, and updating an association relationship between a logical address and a physical address, and
the processor is configured to register the sub-read command corresponding to the sub-read data in the command internal process unit, when the sub-read data is determined to be stored in the temporary memory area and subsequently the sub-read data is determined to be absent in the temporary memory area.

7. The semiconductor memory device according to claim 2, wherein
the I/O command is a write command,
the plurality of sub-I/O commands are respectively a plurality of sub-write commands,
the processor is configured to perform another process that is a process that includes deleting or changing data in the temporary memory area in parallel to a process of the sub-write command, and updating an association relationship between a logical address and a physical address, and
the processor is configured to release, from the temporary memory area, an area where previous sub-write data is stored, when a storage destination area of new sub-write data that is sub-write data associated with the sub-write command is reserved in the temporary memory area and the previous sub-write data is stored in the temporary memory area, the previous sub-write data being sub-write data to be updated with the new sub-write data.

8. The semiconductor memory device according to claim 7, wherein
a predetermined hardware logic circuit among the one or more hardware logic circuits is configured to notify the higher-level apparatus of completion of the write command, when the plurality of sub-read commands respectively corresponding to the sub-write commands are stored in the temporary memory area.

9. The semiconductor memory device according to claim 1, wherein
the temporary memory area is a buffer.

10. The semiconductor memory device according to claim 1, wherein
each of the one or more hardware logic circuits is configured to output information that indicates a result of a process, to a log area, and
the processor is configured to identify at least one of a failure site and failure details from information stored in the log area, in case a failure occurs.

11. The semiconductor memory device according to claim 1, wherein
the memory element group includes a plurality of high-speed physical areas and a plurality of low-speed physical areas,
a logical space provided for the higher-level apparatus by the memory controller is divided into a high-speed logical area that is a logical area to which the high-speed physical area is allocated, and a low-speed logical area that is a logical area to which the low-speed physical area is allocated,
a process of an I/O command where a logical address belonging to the high-speed logical area is designated is performed by at least one among the one or more hardware logic circuits but not by the processor, and
a process of an I/O command where a logical address belonging to the low-speed logical area is designated is performed not only by at least one among the one or more hardware logic circuits but also by the processor.

12. The semiconductor memory device according to claim 1, wherein
the memory controller is configured to receive the I/O command according to PCI-Express from the higher-level apparatus.

13. A storage apparatus, comprising:
a plurality of semiconductor memory devices; and
a storage controller configured to transmit an I/O command to at least one of the plurality of semiconductor memory devices, based on an I/O request issued by a host computer,
the at least one of the plurality of the semiconductor memory devices comprising:
a memory controller including a processor configured to process at least a part of the I/O command from the storage controller when the part of the I/O command satisfies a predetermined condition, and one or more hardware logic circuits, which are different from the processor, and are configured to process the entire I/O command when the I/O command does not satisfy the predetermined condition; and
a memory element group that is one or more semiconductor memory elements configured to store data input and output by the memory controller, the data being at least a part of I/O target data associated with the I/O command,
wherein the memory controller comprises a temporary memory area, and
wherein the predetermined condition is satisfied when at least a part of the I/O target data is stored in the temporary memory area.

* * * * *